Nov. 19, 1946.  L. L. WEISGLASS  2,411,486
LIGHT MEASURING DEVICE FOR PHOTOGRAPHIC ENLARGERS
Filed Dec. 7, 1945  4 Sheets-Sheet 1

INVENTOR.
Louis L. Weisglass
BY Walter E. Wallheim
ATTORNEY

INVENTOR.
Louis L. Weisglass
BY
Walter E. Wallchem
ATTORNEY

Nov. 19, 1946.   L. L. WEISGLASS   2,411,486
LIGHT MEASURING DEVICE FOR PHOTOGRAPHIC ENLARGERS
Filed Dec. 7, 1945   4 Sheets-Sheet 4

INVENTOR.
Louis L. Weisglass
BY Walter E. Wallheim
ATTORNEY

Patented Nov. 19, 1946

2,411,486

UNITED STATES PATENT OFFICE 2,411,486

LIGHT MEASURING DEVICE FOR PHOTOGRAPHIC ENLARGERS

Louis L. Weisglass, New York, N. Y., assignor, by mesne assignments, to Simmon Brothers, Inc., Long Island City, N. Y., a corporation of New York Application December 7, 1945, Serial No. 633,475

16 Claims. (Cl. 88—23)

The object of this invention is a light measuring device which is particularly well adapted to analyze the enlarged image of a photographic negative as projected by a photographic enlarger. In order to secure more perfect prints from photographic enlargers it is desirable to know the light intensity of the brightest and of the darkest point or image element as it appears on the easel of the enlarger. The solution of this problem is difficult since the intensity thus produced is low, particularly for the dark points, and because, furthermore, these densities may vary over an exceedingly wide range since they depend upon many factors such as the diaphragm setting of the lens, the density of the photographic negative, the magnification ratio and the condition and supply voltage of the lamp within the enlarger, each of these factors itself being capable of wide variations. For this reason, no really satisfactory device has as yet been produced.

The general principle of a device to satisfy the aforesaid conditions is as follows: Two electrical circuits are being used, the output voltage of the first circuit being controlled by a photo-sensitive device and the output voltage of the second circuit being controlled by some suitable manually operated voltage control device. The output voltages of both circuits are made to oppose each other, and a balance indicator is provided by means of which the operator can see when, as a consequence of his manipulation of said voltage control device, the difference between the two output voltages assumes a predetermined value.

In order to obtain the necessary wide range, the following means are employed: The first circuit which contains the photo-sensitive element is equipped with a sensitivity control which provides several steps of sensitivity. The voltage control element of the second circuit is stepless and adapted to adjust the output voltage of said circuit from a minimum to a maximum value during one operating cycle, but can run through this operating cycle repeatedly while being moved by the operator in the same direction. This voltage control device actuates mechanically an indicator which indicates, on one continuous scale, light intensity values from a minimum to a maximum value during one operating cycle, but this indicator can run through its operating cycle only once while the voltage control device runs through its operating cycle several times at the same time. This voltage control device, or more accurately, the light intensity indicator associated therewith serves at the same time to actuate the aforementioned sensitivity control of the first circuit in such a way that the sensitivity of the photo-sensitivity device is switched from one step to the next one whenever the voltage control device completes one operating cycle.

For example, if the voltage control device during one operating cycle is changing the indicated light intensity in the proportion of 1:10 and, if the intensity control has three steps in the proportion of 1:10:100, the total range of this device will be 1:1000. This is a very much larger range than obtainable by means known heretofore.

A preferred form of a light measuring device built according to this invention is illustrated in the accompanying drawings, in which

Figs. 4, 5 and 6 show sectional views of the container for the photo electric cell with the built-in sensitivity control and in detail

Figs. 7, 8 and 9 show the main control unit, certain parts having been omitted in the interest of clarity.

Like characters of reference denote similar parts throughout the several views and the following specification.

Figure 1:
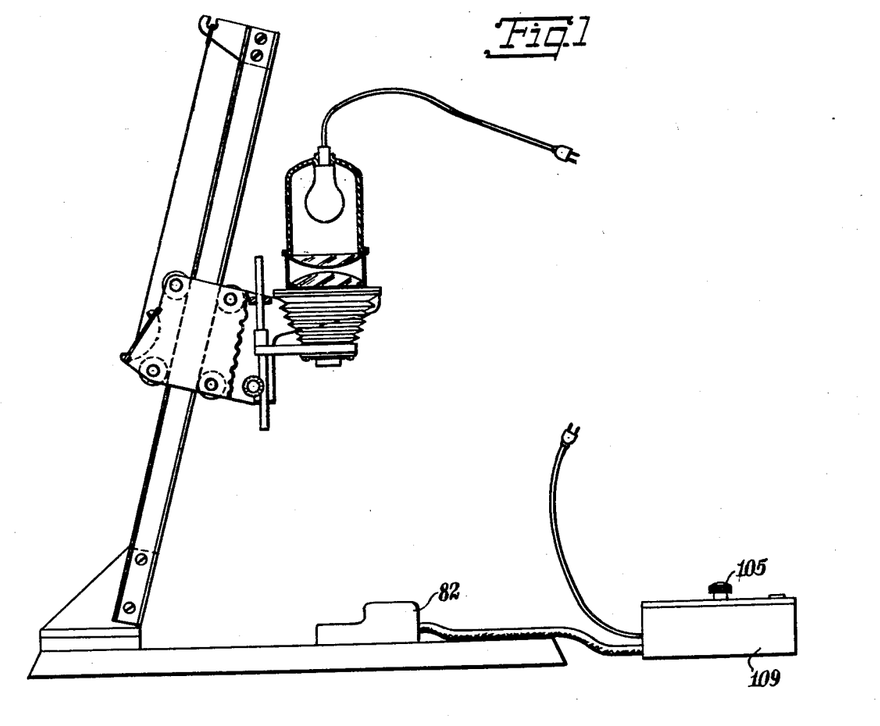
Fig. 1 shows the general arrangement of the device in connection with a typical photographic enlarger.

Fig. 1 shows the light measuring device as applied to a typical enlarger. The enlarger consists in a well known manner of a baseboard, an inclined upright column and a projector assembly sliding on the column. The projector assembly comprises a lamp housing with a lamp and a condenser, means to support a photographic negative underneath said condenser and an enlarging lens in adjustable relationship in front of said negative. The light measuring device consists of two principal parts, a small housing which contains the photosensitive device with its sensitivity control and a larger housing which contains the other mechanical and electrical elements. These two principal parts are connected by a multiple conductor cable, and a second cable equipped with a conventional plug permits the device to be connected to any standard socket.

I shall now describe the various component parts which go into a device built according to this invention.

*Photosensitive device and supply circuit*

The photosensitive device may be of any suitable type and description of which numerous modifications are well known in the art. It may, for example, be a photovoltaic cell of the copper oxide or selenium type, or it may be any of the various well known types of vacuum or gas filled cells which, of course, would have to be used together with a suitable amplifier system. In practice I prefer to use a tube of the socalled electron-multiplier type together with a supply circuit which has been disclosed in my prior application No. 585,350. It will be understood that this is merely a preferred type of photosensitive device and that my invention is not necessarily restricted to its use. The photo sensitive electron-multiplier tube with the associated supply circuit is represented by the left half of the diagram shown in Fig. 2. The electron-multiplier tube 10 comprises an evacuated glass vessel 11 and a number of electrodes mounted therein. The first electrode 12 has a photoemissive coating consisting in a well known manner of a thin layer of potassium or a similar metal. A number of other electrodes 13—21 are also mounted within that vessel. A voltage of approximately 100 volt is impressed between two adjacent electrodes and starting with the photosensitive electrode 12 each following electrode is positive with respect to its predecessor. The last electrode 21 is then connected to a load device as will be explained later.

The supply circuit necessary to provide the necessary potential between adjacent electrodes may be designed in many conceivable ways and merely as a preferred arrangement I am using a circuit which has been disclosed in application No. 585,350. This circuit comprises a number of condensers 22—30. The points intermediate two condensers are connected to switch buttons 31—40, which are circularly disposed on a plate made from some suitable insulating material such as Bakelite or hard rubber. In the center of this switch button circle is a rotating shaft which carries two brushes 41 and 42, which are respectively connected to slip rings 43 and 44. These slip rings, in turn, are in contact with brushes 45 and 46. This rotating switch is again shown in Fig. 3. As can be seen the two brushes 41 and 42 together with the slip rings are mounted on a shaft 47 which must be made from insulating material and which also carries a gear 48, which, in turn, is in mesh with a smaller gear 49, which is driven by the small electric motor 50. The two brushes 45 and 46 are conductively connected to a suitable source of direct current, brush 45 being connected to the positive and brush 46 to the negative pole. This source of D. C. may be of any convenient design and merely for the sake of completeness I am showing a transformer with an iron core 51, a primary coil 52 and a secondary coil 53. This secondary coil charges a condenser 54 through a rectifying tube 55, see Fig. 2.

Figure 2:
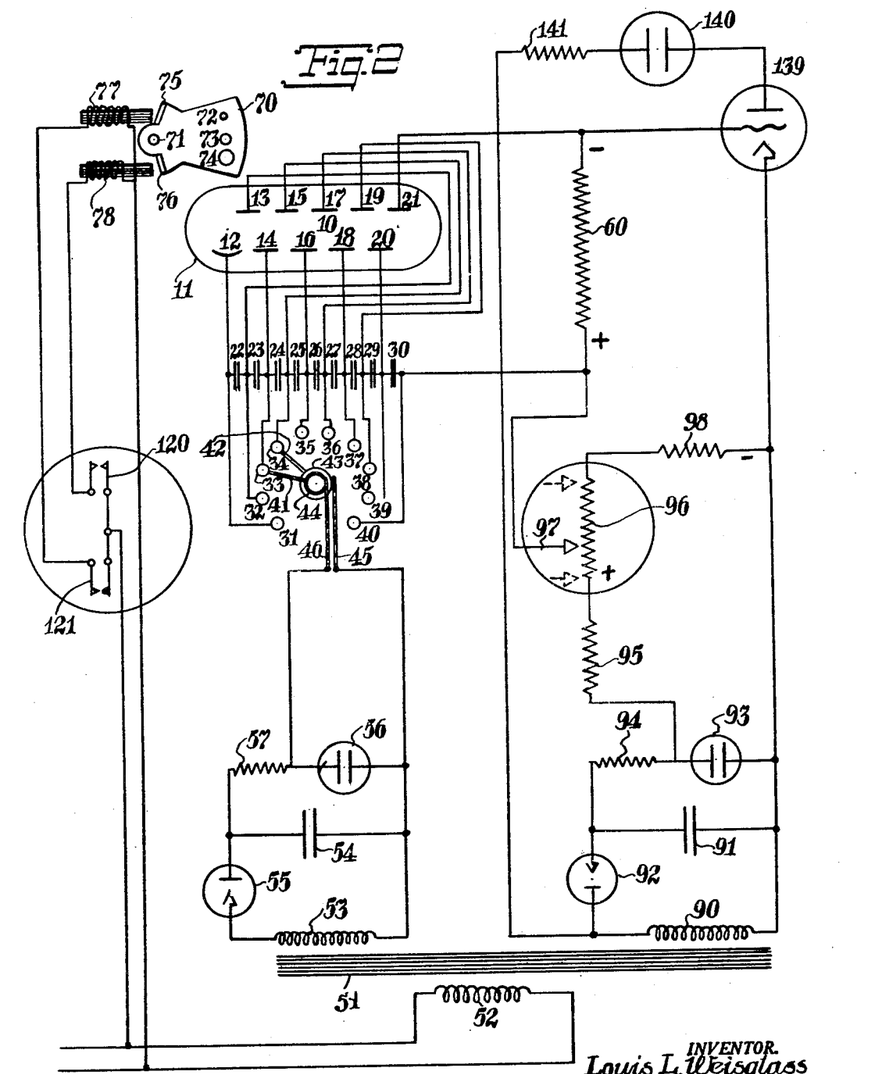
Fig. 2 is the circuit diagram.
Figure 3:
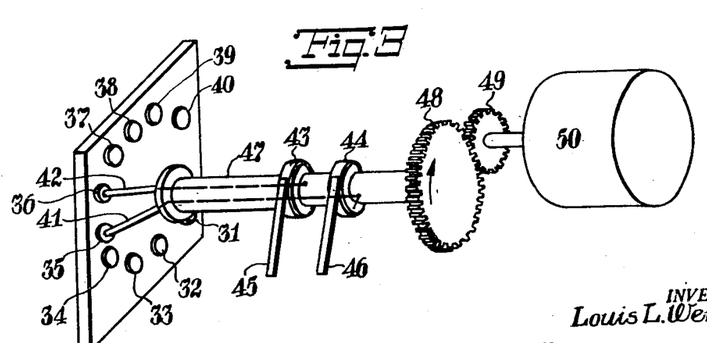
Fig. 3 illustrates a certain rotating switch used in connection with the supply circuit of a photo electric cell forming part of the device.

This rectifying tube has in the usual manner an anode and a hot cathode, and the heating circuit for said cathode may be supplied either by a separate transformer or, simply, by a few turns of wire wound on the same core as the aforementioned primary and secondary coils. Since these expedients are well known, the heating circuit has not been shown in the wiring diagram. Since it is highly desirable to have the voltage stabilized, i. e., made independent of line voltage fluctuations, I am using in a well known manner a gas filled voltage regulating tube in series with a suitable resistance 57, the two terminals of the tube 56 being connected to the two brushes 45 and 46 respectively.

In operation, the two brushes 41 and 42 rotate continuously, driven by motor 50, and successively charge each of the condensers 22—30 to substantially the D. C. voltage impressed upon stabilizing tube 56. The condensers are sufficiently large to suffer only a small voltage loss by the current drain through the multiplier tube during the time interval elapsing between subsequent revolutions of the brushes 41 and 42. Light impinging upon electrode 12 releases a small number of electrons which are accelerated by the voltage of condenser 22 and impinge upon electrode 13, there knocking off secondary electrons. The number of the secondary electrons is larger than the number of the primary electrons, and the ability of the tube to "multiply" electrons is based on this fact. The secondary electrons emitted by plate 13, in turn, impinge upon electrode 14 and knock off still more electrons there, and this process is repeated at each subsequent stage until a high amplification is obtained. The last condenser 30 is not directly connected to the last electrode 21 but a resistance 60 is interposed. This resistance is of the general order of approximately 1 megohm. For more detailed description of this circuit I wish to refer to my co-pending application No. 585,350.

*Sensitivity control*

The sensitivity of the photosensitive circuit may be controlled in many conceivable ways, and these methods may be either electrical or optical, i. e., one may either change the electrical characteristics of the circuit by changing one or several of the circuit elements or one may change the light admittance of the system while keeping the electrical characteristics constant.

Either expedient is possible, but it is slightly advantageous to change the sensitivity by optical means since in this manner the adjustment of the photosensitive circuit need not be changed. The sensitivity may be controlled by optical means in many ways, and the simplest is to change the size of the light admitting aperture. This method is quite justifiable under the circumstances since low intensities will have to be measured usually with high magnification ratios of the enlarger and vice versa.

Merely as a preferred method I am showing a way to control the sensitivity of the device in three steps by changing the size of the aperture through which light is admitted to the photosensitive device. This is done by means of a pivoted vane 70 which may rotate on a pivot 71 and which has three apertures 72, 73 and 74. This vane must be made from opaque material such as aluminum. Two small pieces of iron 75 and 76 are fastened to this vane and two solenoids 77 and 78 are provided. A spring 79 serves to keep the vane in its center position as long as none of the solenoids is energized.

Figure 4:
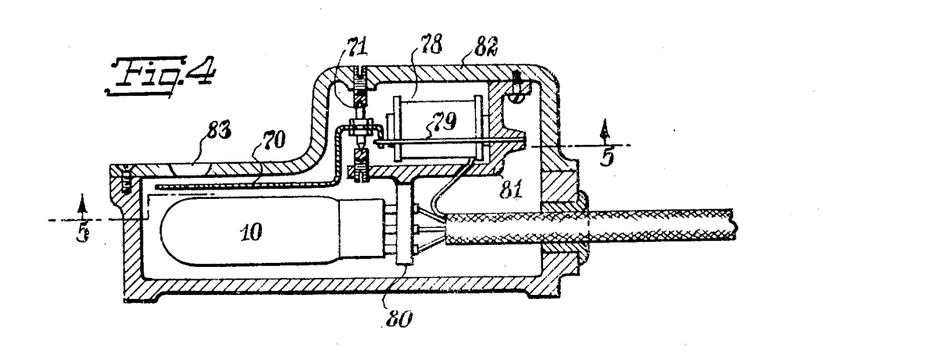
Fig. 4 represents a sectional view along the plane of line 4—4 in Fig. 5.
Figure 5:
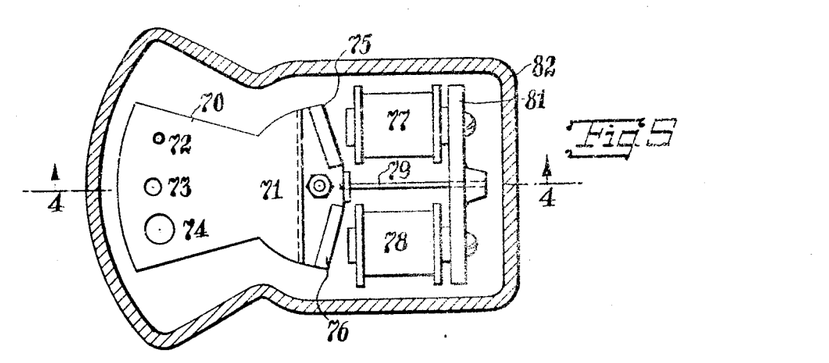
Fig. 5 is a sectional view along the plane of line 5—5 in Fig. 4.
Figure 6:
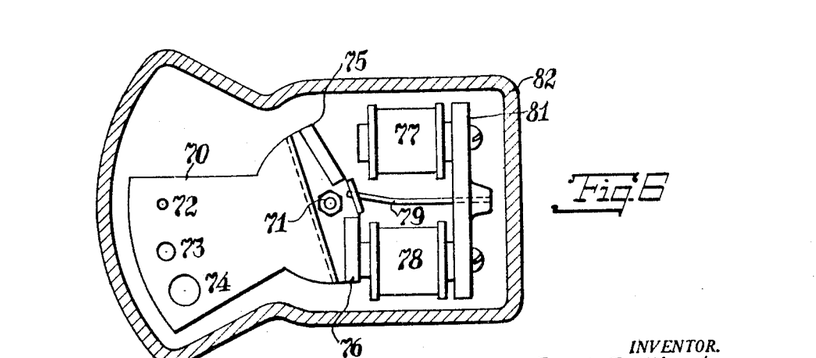
Fig. 6 is identical with Fig. 5 except that it shows the sensitivity control in a different position.

This arrangement is shown schematically in Fig. 2 and can be seen in detail in its actual proportions in Figs. 4, 5 and 6. The photoelectric cell 10 is supported by a multiple conductor socket 80 in a well known manner. This socket is fastened to a bracket 81 which is, in turn, supported within a housing 82. This housing is adapted to be placed on the enlarger easel in a manner shown in Fig. 1. It has an aperture 83 through which light may fall upon the tube 10 or, more particularly, upon its photoemissive electrode 12. Between aperture 83 and the tube 10 is the vane 70 with its three apertures. As can be noted in Fig. 5, the spring 79 which tends to keep the vane in its center position is merely a piece of stiff steel wire or the like. Therefore, ordinarily, i. e., when none of the two solenoids is energized, vane 70 will assume the position shown in Fig. 5, i. e., aperture 73 will be immediately underneath and in register with the aperture 83 in the housing 82 and the light admittance of the photo tube will, therefore, be governed by the diameter of aperture 73. In Fig. 6 the same arrangement is shown with the solenoid 78 energized. Obviously, solenoid 78 attracts the iron piece 76 thereby rotating vane 70 in such a way that the small aperture 72 is now underneath and in register with aperture 83 of housing 82. The force of magnet 78 must, of course, be stronger than the force of spring or steel wire 79. If the other solenoid 77 is energized the conditions will, of course, be reversed, and aperture 74 will now be in register with the housing aperture 83. Apertures 72 and 73 must be smaller than the aperture 83. Aperture 74 may be smaller than aperture 83 in which case the light admittance is controlled by the diameter of aperture 74, or aperture 74 may be larger than aperture 83 in which case the light admittance is controlled by the diameter of aperture 83. The circuit which controls the two solenoids 77 and 78 will be described later.

*Voltage control device and supply circuit*

The voltage control device and the supply circuit are shown on the right half of the wiring diagram, Fig. 2. A D. C. voltage is supplied in the usual manner, i. e., a transformer secondary 90 charges a condenser 91 through rectifying tube 92. The secondary 90 may be part of a separate transformer or, preferably, it may be wound on the same core as the aforementioned coils 52 and 53. The heating circuit for the hot cathode of the rectifying tube has again been omitted from the wiring diagram in the interest of clarity. The condenser 91 is again connected to a gas filled voltage regulating tube 93 which is in series with a suitable resistance 95. Parallel to the voltage regulating tube 93 is a load circuit formed by a fixed resistor 95, a resistor 96 with a movable contact 97 and another fixed resistor 98, all three resistors connected in series. The resistor 96 with the sliding contact 97 constitutes the repeatedly mentioned voltage control device of this circuit.

Figure 7:
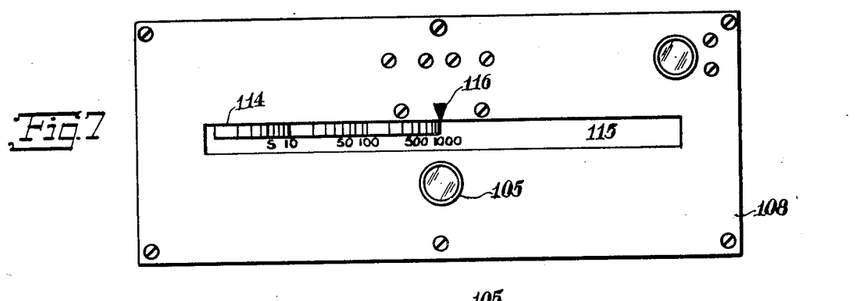
Fig. 7 is a plan view of the main control unit with certain parts omitted for sake of clarity.
Figure 8:
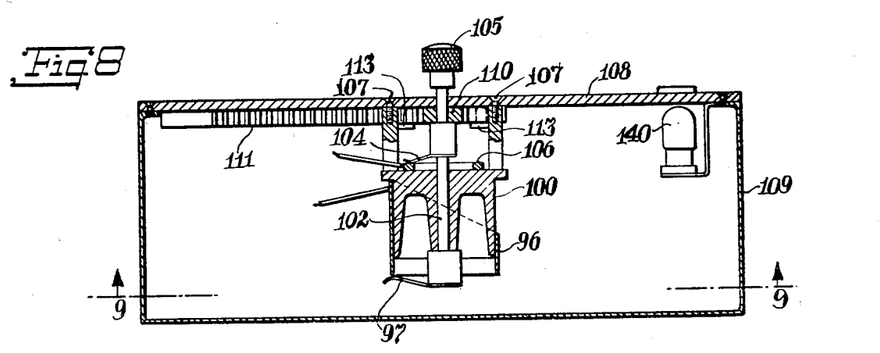
Fig. 8 is a sectional view along the plane of line 8—8 in Fig. 9.
Figure 9:
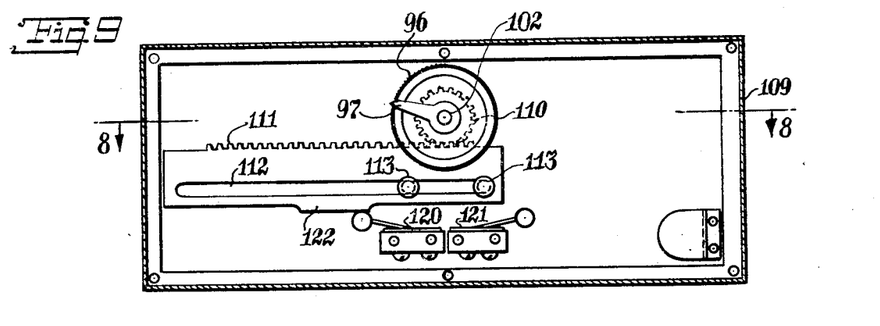
Fig. 9 is a sectional view along the plane of line 9—9 in Fig. 8.

The mechanical construction of this voltage control device can be seen in Figs. 8 and 9. Its principal parts are the cylindrical supporting body 100, the resistance element 96, the rotatable shaft 102, carrying the two contact springs 97 and 104 and being equipped with an insulated knob 105. The contact spring 104 slides on a metallic ring 106. The entire device is mounted by means of studs 107 on the top panel 108 of the control box 109. This control box contains in reality all the electrical elements shown in the wiring diagram of Fig. 2 with the exception of the multiplying tube 10 and the sensitivity control, as described, which are contained in housing 82 as explained above. It will be understood that the disposition of these various circuit elements within box 109 is of no particular importance and most of them have, therefore, not been shown in Figs. 7, 8 and 9. It will be understood that contact 97 really travels in a circle, as shown in Fig. 9, and that in the diagram in Fig. 2 its motion is shown as along a straight line merely as a schematic simplification.

Figure 10:
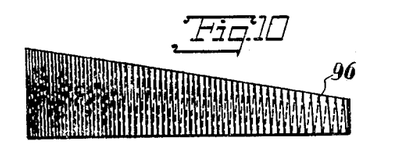
Fig. 10 shows the resistance element of the voltage control device.

The most important part of the voltage control device is the resistance element 96 which is shown again in Fig. 10. It is desirable to have the scale on which the light intensities can be read divided in logarithmic progression and it is, therefore, necessary to devise a resistance element which will have a logarithmic attenuation. This is done by winding resistance wire on a flat strip of flexible insulating material such as fibre or Bakelite or the like, of trapezoidal shape, as shown in Fig. 10. Obviously, the mere trapezoidal shape alone will not give really logarithmic attenuation, and I am, therefore, in addition to using this shape, winding the wire with a variable pitch, i. e., on the left side of Fig. 10, where the trapezoid is high, the wire is wound very closely, but the distance between adjacent convolutions is increasing, until at the right end of Fig. 10, where the trapezoid is low, the distance between two adjacent wires is relatively large. After the resistance element has been wound in this manner and the wire has been fixed to the insulating strip by suitable means, it is bent into a circular shape and fixed to the cylindrical supporting part 100. The tip of contact 97 must, of course, be so wide that even at the low end of resistance element 96 it never loses contact with at least one wire.

The length of the resistance element 96 and the diameter of the supporting part 100 must be matched in such a way that the two ends of 96 meet each other when said resistance element is wrapped around the supporting part 100. This is important since it is necessary that the spring 97, when rotated by turning shaft 102, never loses contact with at least one wire of the resistance element 96. In this manner, it will be possible to rotate this voltage control device several times, i. e., make it run through its operating cycle repeatedly, while turning knob 105 always in the same direction. The purpose of this arrangement will be explained later.

*Light intensity indicator*

The light intensity indicator is merely an element which is mechanically connected to the voltage control device just described and which is adapted to run through its operating cycle once while the voltage control element runs through its operating cycle several times. The simplest mechanical connection consists of a pair of gears, a relatively small gear being connected to the shaft of the voltage control device and a larger gear being part of the light intensity indicator. A gear rack may be used instead of the large gear since a gear rack is merely a gear with an infinitely large diameter. A scale is carried by the indicator cooperating with a fixed mark and indicating light intensity values from a minimum to a maximum value.

An arrangement of this type is shown in Figs. 7, 8 and 9. The small gear 110 is attached to the shaft 102 of the voltage control device, and this gear is in mesh with a gear rack 111. This gear rack has a slot 112 which engages two guide pins 113 fastened to the top 108 of the container 109. Scale 114 is fastened to the gear rack 111, and this scale is visible through a slot 115 in top panel 108, see Fig. 7. A fixed mark 116 on this top panel cooperates with scale 114. It will be understood that this arrangement could be reversed, i. e., the mark could be attached to the gear rack 110, and the scale could be fixedly attached to the top panel 108. As shown in the drawings, the voltage control element makes three revolutions while the light intensity indicator runs through the entire length of its scale once, and the light intensity indicator comprises three decade divisions of logarithmically progressing scales.

Switch circuit for sensitivity control

As seen on the left side of wiring diagram, Fig. 2, the two solenoids 77 and 78 are controlled by two normally open switches 120 and 121. These switches are physically arranged as shown in Fig. 9. The switches shown are of the so-called microswitch type, but it will be understood that any other type may be equally applicable for this purpose. The switches are actuated by a cam abutment 122 which is attached to gear rack 111. In the position shown in Fig. 9, switch 120 is depressed and its circuit closed, whereas switch 121 is open. Consequently, solenoid 78 will attract the iron piece 76 fastened to weight 70, and the small aperture 72 will now control the light admittance to the photoelectric cell. If the operator turns knob 105 and thereby gear 110, the gear rack 111 will move to the right, Fig. 8, and, after one revolution of gear 110, the cam abutment 122 will no longer depress switch 120. In this position, i. e., during the second revolution of gear 110, the cam abutment 122 will assume a position between the two switches 120 and 121, leaving both of them open. As a result, neither of the solenoids 77 or 78 will be energized, and vane 70 will assume the position shown in Figs. 2 and 5, where the center hole 73 controls the light admittance. If the operator continues to turn knob 105, cam abutment 122 will move further to the right, Fig. 8, and eventually, i. e., at the beginning of the third revolution of knob 105, will depress switch 121. This will close the circuit for solenoid 77 which will now attract iron piece 75 thereby rotating vane 70 until the large aperture 74 is in register with the aperture 83 of the photocell housing 82, Fig. 4. It will be clear that during the first revolution, i. e., while the smallest hole 72 controls the light admittance of the device, the sensitivity of the photocell will be smallest or the indications of the light intensity indicator largest. During the second revolution of the voltage control device, the light admittance will be controlled by the medium sized hole 73, making the sensitivity of the device higher than during the first revolution and, consequently, the indicating light intensity of the scale lower. During the third revolution the largest hole 74 will be in control of the light admittance to the photoelectric cell, which will make the light admittance for the sensitivity of the device largest and, consequently, the scale values of the indicator smallest. The change in circuit conditions which occurs during one operating cycle, i. e., one revolution, of the voltage control element equals the change in circuit conditions due to the shift from one step of sensitivity control to the next one. The most convenient arrangement is to provide a range of 1:10 for one revolution or one operating cycle of the voltage control device and to make the area of the three apertures of the sensitivity control in the proportion of 1:10:100 thereby providing a total range of 1:1000 for the whole device. Suitable dimensions for the apertures in the pivoted vane are, for example, .250", .079" and .025" diameter.

Balance indicator

It was explained above that I provide two circuits, the output voltage of the first being controlled by a photosensitive device and the output voltage of the second by a manually controlled voltage regulating device. The two output voltages are made to oppose each other, and an indicator is provided by means of which the operator can see when the difference of the two output voltages assumes a predetermined value. This balance indicator may be of any convenient design and, for example, a sensitive galvanometer will serve quite well. In this case, of course, it would be most logical to adjust the two voltages until they are equal to each other or until their difference becomes zero. Merely as a preferred device I am using a gas filled thyratron tube 139 in series with a load device which indicates when the thyratron becomes current conducting. A thyratron is a gas filled tube which has a hot cathode, a grid and an anode. A bias voltage is impressed between the cathode and the grid and, depending upon whether this bias voltage makes the grid sufficiently negative with respect to the cathode or not, the thyratron becomes current conducting. The load device which must be inserted in the plate circuit of the thyratron in order to indicate whether current flows through the thyratron may again be of any suitable type, and again a galvanometer or milliamperemeter may be used. Again, merely as a preferred device, I am using a small glow lamp 140 filled with neon or some other suitable gas. This lamp lights up as soon as the thyratron becomes current conducting, i. e., as soon as the grid voltage is not sufficiently negative with respect to the cathode. Usually this cut off bias is of the order of two volts, i. e., as long as the grid is more than two volts negative with respect to the cathode, no current will flow from the anode to the cathode of the tube 139, but as soon as the grid voltage becomes more positive than −2 volts the tube will become current conducting and the glow lamp will light up.

Referring to the circuit diagram in Fig. 2, it can be seen that the output voltage of the first photosensitive circuit is impressed upon resistance 60, and the output of the second circuit is impressed upon the series connected resistors 95, 96 and 98. Of this last mentioned voltage that portion between the sliding contact 97 and the negative end of resistance 96 plus the voltage across resistance 98 opposes the voltage across resistance 60. In other words, the resistance 98, part of the resistance 96 and the resistance 60 are connected in series and constitute the grid circuit of the thyratron. The voltage across resistance 60 tends to impress a negative voltage on the grid, whereas the voltage across resistance 98 plus part of resistance 96 tends to impress a positive voltage across said grid with respect to the cathode of the thyratron. As long as the voltage across 60 is more than two volts larger than the voltage across 98 plus part of 96 the thyratron will not conduct current, but as soon as this difference is less than two volts, the grid will not be sufficiently negative with respect to the cathode and current will begin to flow which immediately can be seen by the fact that the neon lamp 140 lights up. In series with neon lamp 140 is a resistance 141 which is merely a current limiting device. The plate circuit of the thyratron with the neon tube could be energized by any suitable source of alternating current, and merely as a convenience I am using the secondary coil 90 which already constitutes a convenient source of alternating current. It is well known that alternating current is necessary for the plate circuit of a thyratron since otherwise the plate current will continue to flow even after the removal of a positive grid voltage.

Operation

The operation of the device can now be well understood. Housing 82 with the photocell and the sensitivity control is placed on the easel of the enlarger in the manner shown in Fig. 1, and the operator selects an image element which he wants to analyze, shifting the housing 82 into such a position that the image element is received by the aperture 83. Depending upon the light intensity of this particular element and upon the position in which knob 105 and scale 140 happen to be, the neon lamp 140 may or may not light up. If the neon tube lights up, it indicates that current passes the thyratron or, in other words, the grid of the thyratron is not sufficiently negative with respect to the thyratron cathode. This again means that the voltage across resistance 60 is smaller than the minimum grid bias plus the voltage across resistance 98 and part of resistance 96. In order to restore the balance the operator now turns knob 105 in such a way that the indicated light intensity becomes smaller or, in electrical terms, Fig. 2, contact 97 will move upwardly. This will decrease that part of the voltage across resistance 96 which is in the grid circuit until eventually, when the grid voltage becomes sufficiently negative, no more current passes thyratron 139 and glow lamp 140, which now no longer lights up.

This situation can best be explained by a simplified numerical example. We shall assume that the critical grid bias of the thyratron is −2 volts. The resistance 96 is adjusted in such a way that a voltage of 45 volts is built up between its positive and its negative end, and the voltage across resistance 98 is 3 volts. The light sensitive circuit is adjusted in such a way that the minimum measurable light for a given aperture size or sensitivity causes a voltage of 5 volts to be impressed on resistance 60, and that the maximum measurable light with the same aperture causes a voltage of 50 volts across resistance 60. In other words, a range of 1:10 for each of the three apertures. Under a minimum light condition the grid voltage of the thyratron can be computed as follows:

| | Volts |
|---|---|
| Voltage across resistance 60 | −5 |
| Voltage across part of resistance 96 in grid circuit, contact 97 in its uppermost position, Fig. 2 | 0 |
| Voltage across resistance 98 | +3 |
| Total grid bias | −2 |

Under a maximum measurable light condition we would have the following conditions:

| | Volts |
|---|---|
| Voltage across resistance 60 | −50 |
| Voltage across part of resistance 96 in grid circuit, contact 97 in its lowest position, Fig. 2 | +45 |
| Voltage across resistance 98 | +3 |
| Total grid bias | −2 |

Obviously, for intermediate light intensities, an intermediate position of contact 97 would be capable of restoring the same condition, i. e., adjust the grid of the thyratron to −2 volts. The borderline condition of the neon lamp 140 is quite easily found since there is a narrow range in which it is neither consistently on nor consistently off, but flickers in more or less regular intervals of time.

The above numerical example shows, that the circuit controlled by the voltage control element is so adjusted that the voltage across resistance 96 is 10 times as large as the voltage across resistance 98 plus the minimum grid bias of thyratron 139, and that the photo electric circuit is so adjusted that the maximum voltage across resistance 60 equals the voltage across resistance 96 plus the voltage across resistance 98 plus the minimum grid bias, and that the minimum voltage across 60 equals the voltage across 98 plus said grid bias.

Up to now, I have assumed that the borderline condition of the neon lamp may be obtained by merely adjusting contact 97. I have also explained that this adjustment would change the indicated light intensity in the proportion of 1:10 and it is, therefore, possible that merely adjusting this contact, from its lowest position in Fig. 2 to its highest position, will not be sufficient to reach the borderline position of the neon lamp. In this case the operator continues to turn knob 105 thereby starting another revolution of the sliding contact 97, Fig. 9. As soon as he starts a new revolution, however, one of the contacts 120 or 121 changes its condition, i. e., if one of the contacts was depressed, it now ceases to be depressed and vice versa. This immediately changes the size of the light admitting aperture and, therefore, the sensitivity of the photoelectric circuit. The slidable resistance will now travel through another revolution or operating cycle, again changing the indicated light intensity of the proportion of 1:10, but, since the aperture has been changed, the device now measures light intensities in the next lower decade. The operator will then continue to turn knob 105 in such a way that the indicated light values decreases, but he will work with the next larger aperture which will make the circuit 10 times as sensitive until eventually a position is reached in which the neon lamp is in the borderline condition, i. e., just on the verge of lighting up or not lighting up which is indicated by a more or less regular flicker.

If for any image element which the operator wants to analyze the neon light fails to light up, it would indicate a condition opposite to the one described in the above example, and the operator would then have to turn knob 105 in the opposite direction thereby increasing the indicated light values of scale 114, until again a position is reached where the neon lamp is neither consistently on nor consistently off, but flickers. The operation of the device is convenient, quick and quite accurate within limits which are perfectly acceptable for photographic purposes.

It is obvious that many modifications may be made in the instrumentalities disclosed without departing from the principles of the invention, as defined in the appended claims.

What I claim as new, is:

1. A light measuring device for photographic enlargers comprising a first circuit, a photosensitive device controlling said first circuit, said circuit including a sensitivity control with several steps of sensitivity, a second circuit, a manually controlled, substantially stepless, voltage control device controlling said second circuit, a light intensity indicator mechanically associated with said voltage control device, means to make the output voltages of both circuits oppose each other, and means to indicate when the difference of said two voltages, as a consequence of said voltage control device being actuated by the operator, assumes a predetermined value, said voltage control device adapted to change, in one operating cycle, the output voltage of said second circuit from a minimum to a maximum value, but adapted to run repeatedly through said operating cycle while being actuated in the same direction, said light intensity indicator adapted to indicate on one continuous scale, in one operating cycle, light intensities from a minimum to a maximum value, but adapted to run only once through its operating cycle while being actuated in the same direction, and means to actuate said sensitivity control of the first circuit automatically by said voltage control device of the second circuit, said sensitivity control always advancing one step when said voltage control device completes one operating cycle.

2. A light measuring device according to claim 1, said photosensitive device being a tube of the electron multiplier type comprising an evacuated glass vessel, a plurality of electrodes within the vessel, the first of said electrodes having a photoemissive coating and the other electrodes adapted to emit secondary electrons, and a supply circuit adapted to impress a suitable voltage between each pair of two successive electrodes, whereby the first photoemissive electrode, upon exposure to light, emits relatively few electrons which strike the second electrode causing there the emission of a larger number of secondary electrons which in turn strike the third electrode causing there the emission of a still larger number of electrons, this being repeated at each subsequent state until a high degree of amplification is obtained thereby.

3. A light measuring device according to claim 1, said photosensitive device being a tube of the electron multiplier type comprising an evacuated glass vessel, a plurality of electrodes within the vessel, the first of said electrodes having a photoemissive coating and the other electrodes adapted to emit secondary electrons, and a supply circuit adapted to impress a suitable voltage between each pair of two successive electrodes, whereby the first photoemissive electrode, upon exposure to light, emits relatively few electrons which strike the second electrode causing there the emission of a larger number of secondary electrons which, in turn, strike the third electrode causing there the emission of a still larger number of electrons, this being repeated at each subsequent stage until a high degree of amplification is obtained thereby, said supply circuit comprising a condenser battery, a rotary switch, and a source of direct current, said battery consisting of series connected condensers, the number of condensers being one less than the number of electrodes of said photosensitive tube, said switch comprising a number of stationary, insulated, and circularly disposed switch buttons, said number being equal to the number of said tube electrodes, and a rotatably supported assembly comprising two insulated contact brushes and two insulated slip rings, one contact brush connected to one and the other contact brush to the other of said slip rings, means to rotate said assembly continuously during the operation of the device, said contact brushes being so disposed as to contact during their rotation two adjacent switch buttons, respectively, and two stationary contacts cooperating with said rotating slip rings, the first terminal of the first condenser being connected to the first tube electrode and to the first switch button, the second terminal of the first condenser being connected to the first terminal of the second condenser and to the second tube electrode and to the second switch button, the second terminal of the second condenser being connected to the first terminal of the third condenser and to the third tube electrode and to the third switch button, and subsequent condenser terminals, tube electrodes and switch buttons connected in like manner, the second terminal of the last condenser being connected to the last switch button, a load resistor inserted between said last condenser terminal and the last tube electrode, said source of direct current supplying a voltage substantially as high as that required between two adjacent tube electrodes, and being connected to the aforementioned two stationary contacts cooperating with said two slip rings.

4. In a light measuring device according to claim 1, a housing for said photosensitive device, said housing having an aperture, and said sensitivity control including means to adjust the size of said aperture.

5. In a light measuring device according to claim 1, a housing for said photosensitive device, said housing having an aperture in its top wall, said sensitivity control including a pivoted opaque vane with a plurality of apertures of different sizes, said vane being disposed between said top wall and said photosensitive device, at the most one of the apertures in said vane being larger than the aperture in said housing, and means to rotate said vane thereby bringing selectively one of the apertures of said vane into register with the aperture in said housing.

6. In a light measuring device according to claim 1, a housing for said photosensitive device, said housing having an aperture in its top wall, said sensitivity control including a pivoted opaque vane with a plurality of apertures of different sizes, said vane being disposed between said top wall and said photosensitive device, at the most one of the apertures in said vane being larger than the aperture in said housing, and electro-magnetic means to rotate said vane thereby bringing selectively one of the apertures of said vane into register with the aperture in said housing.

7. In a light measuring device according to claim 1, a housing for said photosensitive device, said housing having an aperture in its top wall, said sensitivity control including a pivoted opaque vane with a plurality of apertures of different sizes, said vane being disposed between said top wall and said photosensitive device, at the most one of the apertures in said vane being larger than the aperture in said housing, and electro-magnetic means to rotate said vane thereby bringing selectively one of the apertures of said vane into register with the aperture in said housing, the supply circuit for said electro-magnetic means including switching means associated with said voltage control device.

8. In a light measuring device according to claim 1, a housing for said photosensitive device, said housing having an aperture in its top wall, said sensitivity control including a pivoted opaque vane with three differently sized apertures, said vane being disposed between said top wall and said photosensitive device, at least two of the apertures in said vane being smaller than the aperture in said housing, a spring normally keeping said vane in a position where the aperture in the middle is in register with the aperture in said housing, and two electro-magnets adapted to be energized one at a time and to bring, against the force of said spring, the vane into a position where one of its two other apertures is in register with the aperture in said housing.

9. In a light measuring device according to claim 1, a housing for said photosensitive device, said housing having an aperture in its top wall, said sensitivity control including a pivoted opaque vane with three differently sized apertures, said vane being disposed between said top wall and said photosensitive device, at least two of the apertures, in said vane being smaller than the aperture in said housing, a spring normally keeping said vane in a position where the aperture in the middle is in register with the aperture in said housing, and two electro-magnets, adapted to be energized one at a time and to bring, against the force of said spring, the vane into a position where one or the other of its two other apertures, respectively, is in register with the aperture in said housing, said two electro-magnets being connected to supply circuits including switches, and means associated with said voltage control device to actuate said switches.

10. A light measuring device according to claim 1, said voltage control device comprising a ring shaped resistor and a shaft with a rotatable contact disposed in the center of said ring and capable of performing more than one revolution, said contact being in current conducting relationship with said resistor.

11. A light measuring device according to claim 1, said voltage control device comprising a ring shaped resistor and a shaft with a rotatable contact disposed in the center of said ring shaped resistor and capable of performing more than one revolution, said contact being in current conducting relationship with said resistor, said resistor being so dimensioned that a substantially logarithmic attenuation is being obtained.

12. A light measuring device according to claim 1, said voltage control device comprising a ring shaped resistor and a shaft with a rotatable contact disposed in the center of said ring and capable of performing more than one revolution, said contact being in current conducting relationship with said resistor, said resistor comprising a strip of flexible insulating sheet material of trapezoidal shape and a large number of convolutions of resistance wire wound thereon, these convolutions being close together at the high end of said trapezoidal strip and relatively widely spaced at the low end, said strip being flat while said wire is being wound thereon, but being bent into a circular shape thereafter and being held in said shape during operation.

13. A light measuring device according to claim 1, said voltage control device comprising a ring shaped resistor and a shaft capable of rotating several times and disposed in the center of said ring, equipped with a contact in current conducting relationship with said resistor, and with a gear, said gear being in mesh with a larger gear capable of performing at the most one full revolution and carrying one continuous scale indicative of light intensity values and cooperating with a fixed mark.

14. A light measuring device according to claim 1, said voltage control device comprising a ring shaped resistor and a shaft capable of rotating several times and disposed in the center of said ring, equipped with a contact in current conducting relationship with said resistor, and with a gear, said gear being in mesh with a larger gear capable of performing at the most one full revolution and carrying one continuous scale indicative of light intensity values and cooperating with a fixed mark, said larger gear also being operatively connected to switching means controlling the sensitivity control of said first circuit.

15. A light measuring device according to claim 1, said first circuit comprising a source of direct current, a photocell with a photoemissive cathode and an anode, and a fixed resistor, the negative pole of said current source connected to said photocell cathode, said photocell anode connected to the negative end of said fixed resistor, and the positive end of said resistor connected to the positive pole of said current source, said second circuit comprising a second source of direct current and a rheostat with a resistor and a sliding contact, the positive end of the resistor connected to the positive and the negative end of the resistor to the negative pole of said second source of current, said rheostat serving as said voltage control device, said means to indicate when the voltage difference assumes a predetermined value comprising a source of alternating current, a load device, and a gas filled thyratron tube with a hot cathode, a grid and an anode, the grid of the thyratron connected to the negative end of the fixed resistor of the first circuit, the positive end of said resistor connected to the sliding contact of said rheostat of the second circuit, and the negative end of said rheostat connected to the cathode of the thyratron, the anode of said thyratron connected to one side of the load device, the other side of said load device connected to one side of said source of alternating current, and the other side of said source connected to the thyratron cathode, said load device adapted to indicate when said thyratron becomes current conductive.

16. A light measuring device according to claim 1, said first circuit comprising a source of direct current, a photocell with a photoemissive cathode and an anode, and a fixed resistor, the negative pole of said current source connected to said photocell cathode, said photocell anode connected to the negative end of said fixed resistor, and the positive end of said resistor connected to the positive pole of said current source, said second circuit comprising a second source of direct current and a rheostat with a resistor and a sliding contact, the positive end of the resistor connected to the positive and the negative end of the resistor to the negative pole of said second source of current, said rheostat serving as said voltage control device, said means to indicate when the voltage difference assumes a predetermined value comprising a source of alternating current, a gas filled glow lamp, and a gas filled thyratron tube with a hot cathode, a grid and an anode, the grid of the thyratron connected to the negative end of the fixed resistor of the first circuit, the positive end of said resistor connected to the sliding contact of said rheostat of the second circuit, and the negative end of said rheostat connected to the cathode of the thyratron, the anode of said thyratron connected to one side of said gas filled glow lamp, the other side of said glow lamp connected to one side of said source of alternating current, and the other side of said source connected to the thyratron cathode, said glow lamp adapted to indicate when said thyratron becomes current conductive.

LOUIS L. WEISGLASS.